(12) United States Patent
Agarwal et al.

(10) Patent No.: US 8,646,067 B2
(45) Date of Patent: Feb. 4, 2014

(54) POLICY DRIVEN FINE GRAIN URL ENCODING MECHANISM FOR SSL VPN CLIENTLESS ACCESS

(75) Inventors: Puneet Agarwal, Bangalore (IN); Ravindra Nath Thakur, Bangalore (IN); Anil Kumar Gavini, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 1130 days.

(21) Appl. No.: 12/359,101

(22) Filed: Jan. 23, 2009

(65) Prior Publication Data

US 2009/0193513 A1 Jul. 30, 2009

Related U.S. Application Data

(60) Provisional application No. 61/023,847, filed on Jan. 26, 2008.

(51) Int. Cl.
*G06F 9/00* (2006.01)
*G06F 15/16* (2006.01)
*G06F 17/00* (2006.01)
*H04L 29/06* (2006.01)

(52) U.S. Cl.
USPC .............................................. 726/15; 713/160

(58) Field of Classification Search
USPC .............................................. 713/160; 726/15
See application file for complete search history.

(56) References Cited

U.S. PATENT DOCUMENTS 6,694,431 B1 * 2/2004 Binding et al. ............... 713/160
7,340,499 B1 * 3/2008 Casella ......................... 709/201
8,011,004 B2 * 8/2011 Kim et al. ...................... 726/15
2006/0112174 A1  5/2006 L'Heureux et al.
2007/0245409 A1  10/2007 Harris et al.
2009/0328194 A1 * 12/2009 Kim et al. ...................... 726/15

OTHER PUBLICATIONS

Network Working Group: Request for Comments: 3986 Uniform Resource Identifier (URI): Generic Syntax T. Berners-Lee; R. Fielding; L. Masinter Jan. 2005.*
Web Services Description Language (WSDL) 1.0 Sep. 25, 2000 Copyright© 2000 Ariba, International Business Machines Corporation, Microsoft.*
Accessanywhere: "IPSec VPN Vs. SSL VPN" Whitepaper, [Online] Aug. 23, 2006, XP002523786 Retrieved from the Internet: URL: http://web.archive.org/web/20060823152307/http://www.accessanywhere.net/wp/SSL-IPSec_Whitepaper.pdf>[retrieved on Apr. 15, 2009].
International Search Report for PCT/US2009/032043 mailed Jul. 5, 2009.

(Continued)

*Primary Examiner* — Kambiz Zand
*Assistant Examiner* — Benjamin Kaplan
(74) *Attorney, Agent, or Firm* — Foley & Lardner LLP; Christopher J. McKenna

(57) ABSTRACT

The present disclosure presents methods, systems and intermediaries which determine an encoding scheme of a uniform resource location (URL) from a plurality of encoding schemes for a clientless secure socket layer virtual private network (SSL VPN) via a proxy. An intermediary may receive a response from a server comprising a URL. The response from the server may be directed to a client via a SSL VPN session and via the intermediary. The intermediary may determine, responsive to an encoding policy, one of a transparent, opaque or encrypted encoding scheme for encoding the URL. The intermediary may rewrite the URL for transmission to the client in accordance with the determined encoding scheme.

26 Claims, 12 Drawing Sheets

(56) References Cited

OTHER PUBLICATIONS

Microsoft: "A technology and features Overview" Intelligent Application Getaway 2007 (Feb. 2007), XP002523787 Retrieved from the Internet: URL: http://download.microsoft.com/download/F/0/2/F0229C11-B47E4002-A444-60207C6E11F5/IAG%202O7%20Technical%20Overview-WP-200702.doc> [retrieved on Apr. 15, 2009].

Microsoft: "Application Firewall Overview" Intelligent Application Getaway 2007, [Online] Feb. 2007, XP002523785, Retrieved from the Internet: URL:http://download.microsoft.com/download /F/0/2/F0229C11-B47E-4002-A444-60207C6E11F5/IAG%202007%20Application%20Firewall_WP-200702.doc> [retrieved on Apr. 15, 2009].

Written Opinion for PCT/US2009/032043 dated Jul. 5, 2009.
Chinese Office Action on 200980110433.X dated Nov. 30, 2012.

* cited by examiner

POLICY DRIVEN FINE GRAIN URL ENCODING MECHANISM FOR SSL VPN CLIENTLESS ACCESS

RELATED APPLICATIONS

The present application claims priority to U.S. Provisional Application No. 61/023,847 filed on Jan. 26, 2008, incorporated herein by reference.

FIELD OF THE INVENTION

The present application generally relates to data communication networks. In particular, the present application relates to systems and methods for fine grain configuration and policy driven Uniform Resource Locator (URL) encoding schemes for clientless Secure Socket Layer (SSL) Virtual Private Network (VPN) access scenarios.

BACKGROUND OF THE INVENTION

A company or an enterprise may provide various services across a network to serve many clients. Some of those clients may want to request access to resources on a private network. For example, a user may access a private network of an enterprise from a public location or network via a virtual private network connection. The user may access a resource that is desired to be protected. The provider might allow clients to access the resource but would like to protect the identification or location of the resource on the private network. For example, a resource may typically be identified by a Uniform Resource Locator (URL). If the provider provides the URL of the resource on the private network, a client or user may try to gain access to that resource via an unsecured means or directly outside of the virtual private network connection. Depending on the access scenario, the provider may not want to provide the URL on the private network directly to the client.

BRIEF SUMMARY OF THE INVENTION

The present disclosure provides solutions to such problems by allowing the provider to use various schemes for encoding URLs and to select the encoding scheme for different clients based on the access scenario. In some scenarios, such protections may involve obscuring or changing the URL of the resources to disable the clients from viewing the resource locations while allowing the clients to access the resources themselves. In some scenarios, providing the resource to the clients while not allowing the clients to see the location of the resources may be done by rewriting, obfuscating or encrypting the URLs the clients receive. Sometimes, the providers may want to alter the URLs in ways which depend on the credibility of the client, the security concerns relating the client, or the type of the client.

In some aspects, the present disclosure is related to systems and methods for determining an encoding scheme of a uniform resource location (URL) from a plurality of encoding schemes for a clientless secure socket layer virtual private network (SSL VPN) via a proxy. An intermediary, or an appliance, may receive a response comprising a URL from a server. The response from the server may be directed to a client via a SSL VPN session and via the intermediary. The intermediary may establish the SSL VPN session between the client and the server. The intermediary may determine, responsive to an encoding policy, an encoding scheme from a plurality of encoding schemes for encoding the URL. The intermediary may also rewrite the URL for transmission to the client in accordance with the determined encoding scheme.

In some embodiments, the policy is a session policy determining at least one rule to trigger at least one action with respect to the established session. In many embodiments, the encoding scheme removes a portion of the URL. In many embodiments, the encoding scheme rewrites a portion of the URL with a portion of another URL. In numerous embodiments, the encoding scheme encrypts a portion of the URL using one or more encryption keys. In many embodiments, the encoding scheme is a transparent encoding scheme. In a plurality of embodiments, the encoding scheme is an opaque encoding scheme. In various embodiments, the encoding scheme transforms the URL using a reversible transformation mechanism. Sometimes, the encoding scheme is an encrypted encoding scheme encrypting a portion of the URL. In many embodiments, the encoding scheme rewrites the URL to a unique identifier, the unique identifier uniquely identifying the URL. In various embodiments, the encoding scheme obfuscates an information relating a directory structure of the server from the URL.

In some embodiments, the intermediary receives a second response comprising a second URL from the server to a second client via a second SSL VPN session. The intermediary may establish the second SSL VPN session between the second client and the server. The intermediary may determine, responsive to the encoding policy, a second encoding scheme from a plurality of encoding schemes for encoding the URL. The intermediary may rewrite the second URL for transmission to the second client in accordance with the determined second encoding scheme. In some embodiments, the policy is a second SSL VPN session policy determining at least one rule to trigger at least one action with respect to the established SSL VPN session.

In some aspects the present disclosure is related to an intermediary for determining an encoding scheme of a uniform resource location (URL) from a plurality of encoding schemes for a clientless secure socket layer virtual private network (SSL VPN) via a proxy. In some embodiments, the intermediary may be also referred to as an appliance or a proxy. The intermediary may comprise a packet engine for receiving a response comprising a URL from a server to a client via a SSL VPN session. The intermediary may establish the SSL VPN session between the client and the server. The intermediary may also comprise a policy engine determining, responsive to an encoding policy, an encoding scheme from a plurality of encoding schemes for encoding the URL. The intermediary may further comprise a rewriter, responsive to the policy engine, rewriting the URL for transmission to the client in accordance with the determined encoding scheme.

In some embodiments the policy of the intermediary is a session policy determining at least one rule to trigger at least one action with respect to the established SSL VPN session. In many embodiments, the encoding scheme removes a portion of the URL. Sometimes, the encoding scheme rewrites a portion of the URL with a portion of another URL. In numerous embodiments, the encoding scheme encrypts a portion of the URL using one or more encryption keys. The encoding scheme may be a transparent encoding scheme. A transparent encoding scheme may modify the URL such that the modified URL comprises a portion or a whole of the original URL within the modified URL. In some embodiments, the encoding scheme is an opaque encoding scheme. An opaque encoding scheme may modify the URL such that the modified URL does not comprise a portion of the original URL within the modified URL.

In many embodiments, the packet engine receives a second response comprising a second URL from a server to a second client via a second SSL VPN session. The intermediary may establish the second SSL VPN session between the second client and the server. The policy engine may determine, responsive to an encoding policy, a second encoding scheme from the plurality of encoding schemes for encoding the second URL. The rewriter, responsive to the policy engine, may rewrite the second URL for transmission to the client in accordance with the determined second encoding scheme. In some embodiments, the policy is a second SSL VPN session policy determining at least one rule to trigger at least one action with respect to the established second SSL VPN session.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
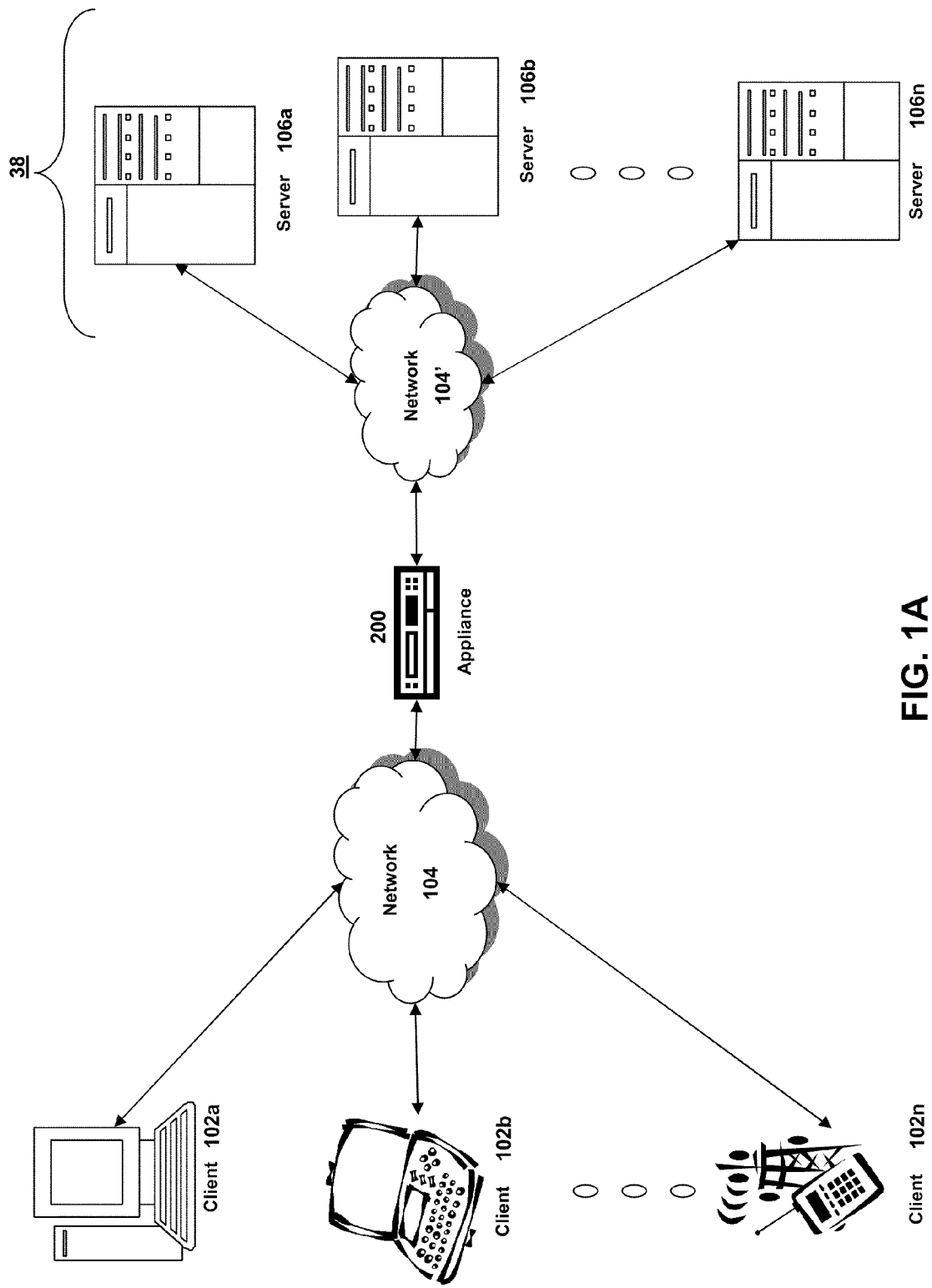
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
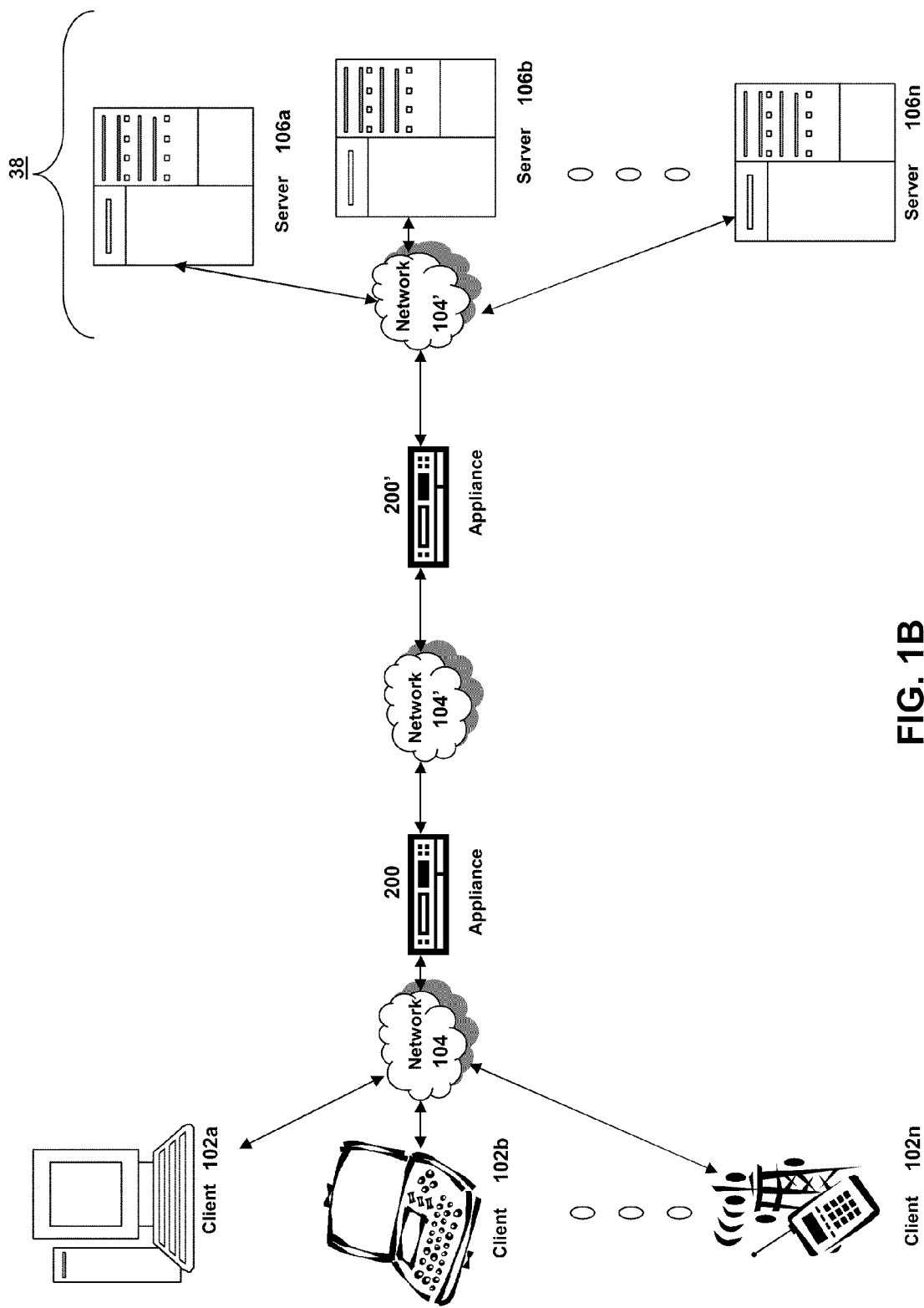
FIGS. 1B-1D are block diagrams of embodiments of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server.

Figure 1C:
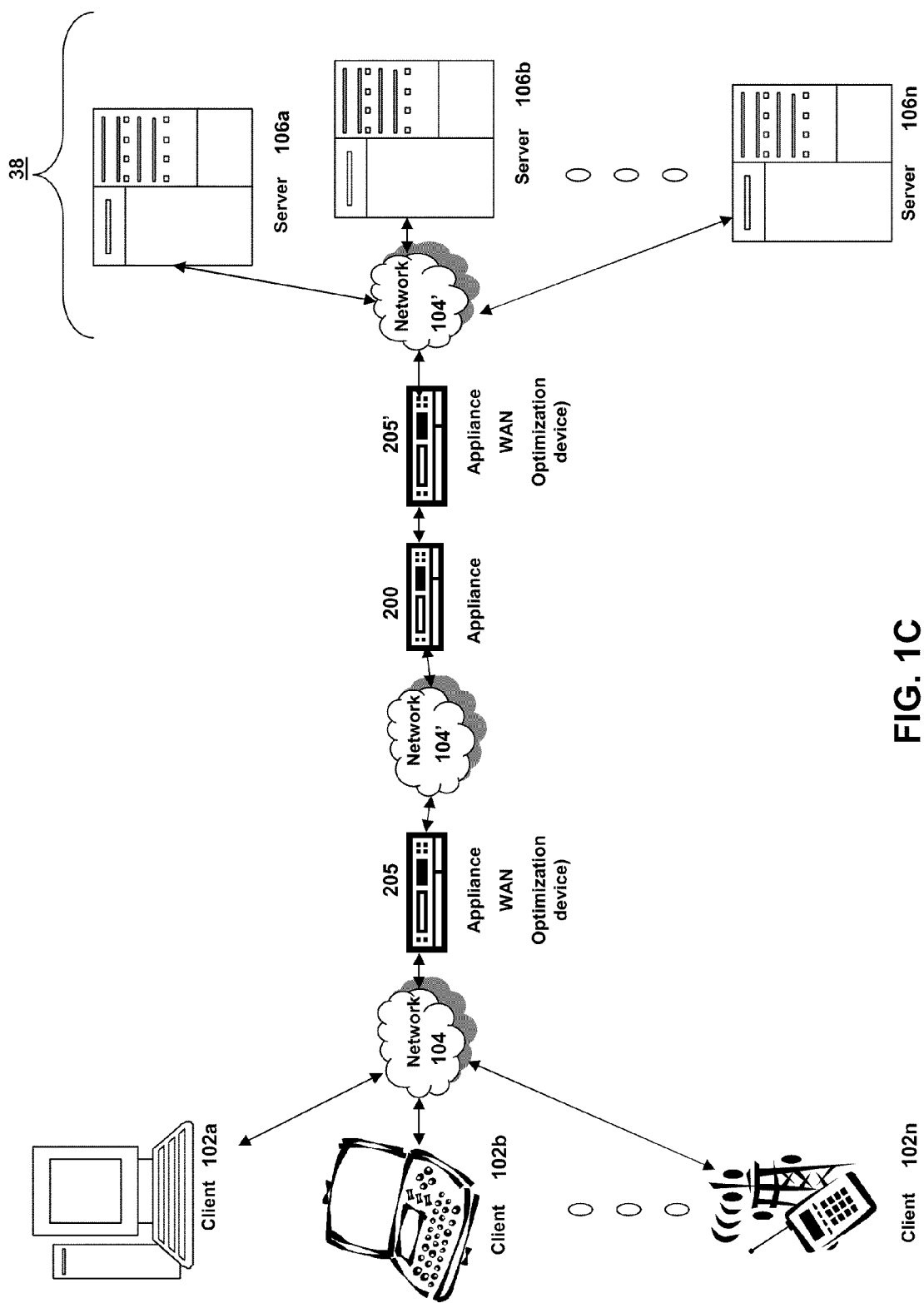

Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
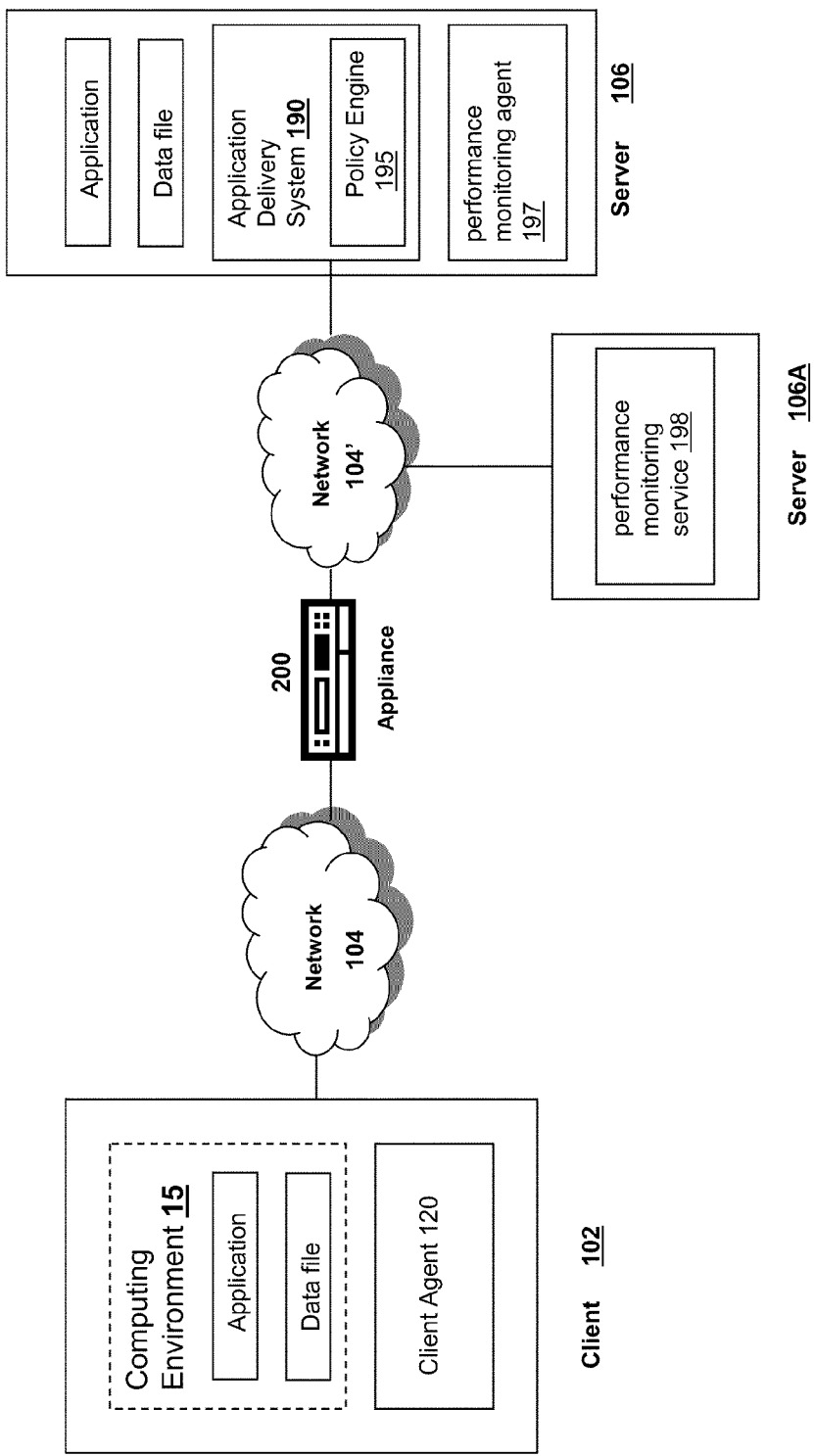

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
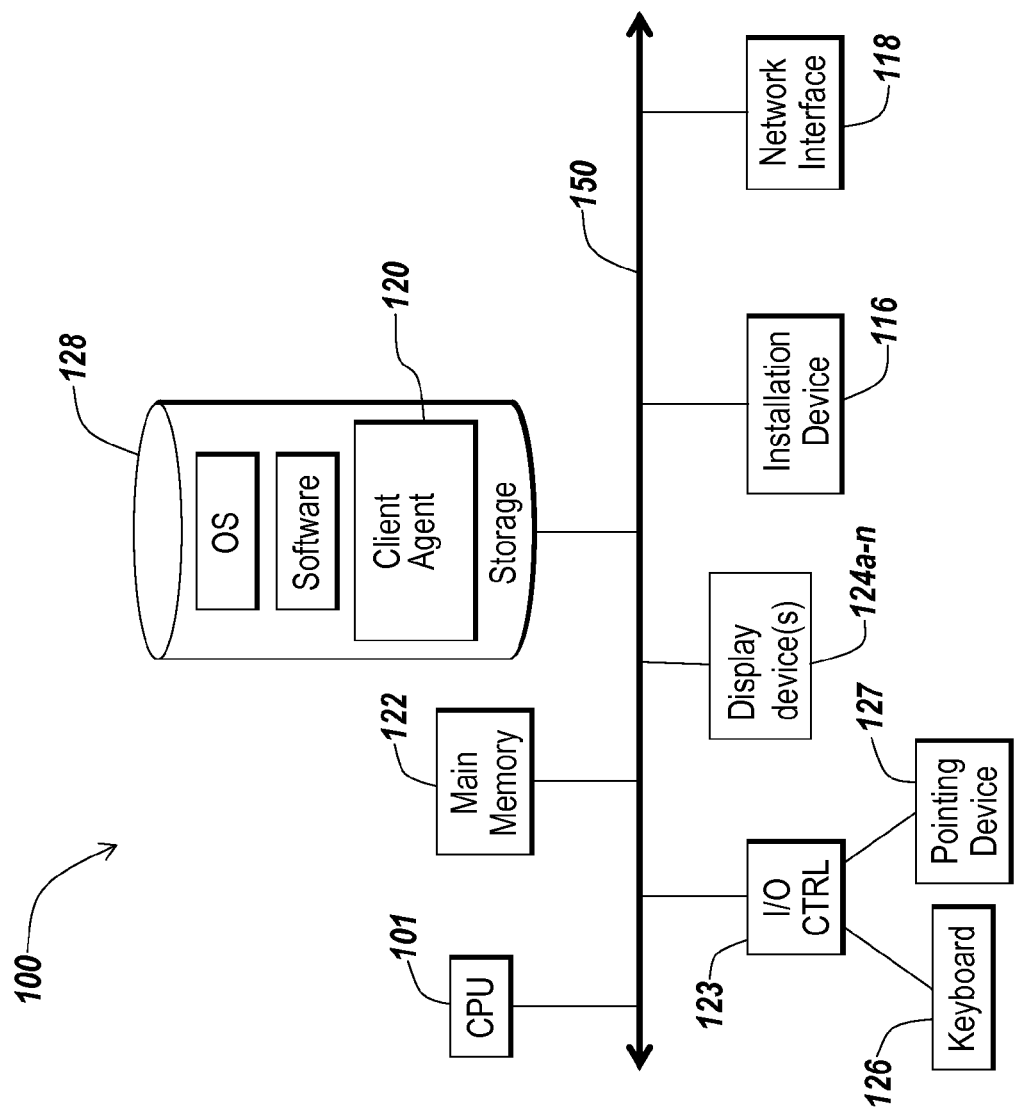
FIGS. 1E and 1F are block diagrams of embodiments of a computing device.
Figure 1F:
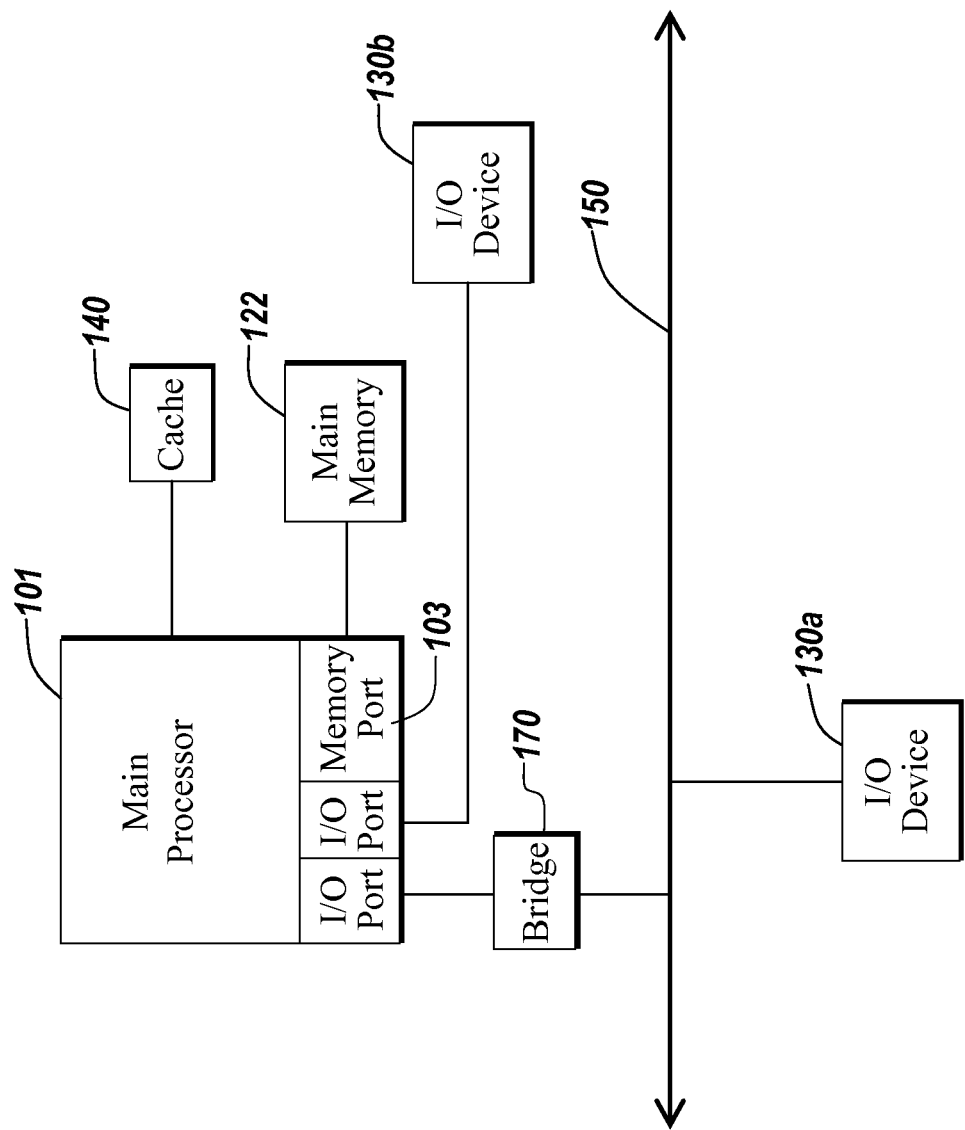

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
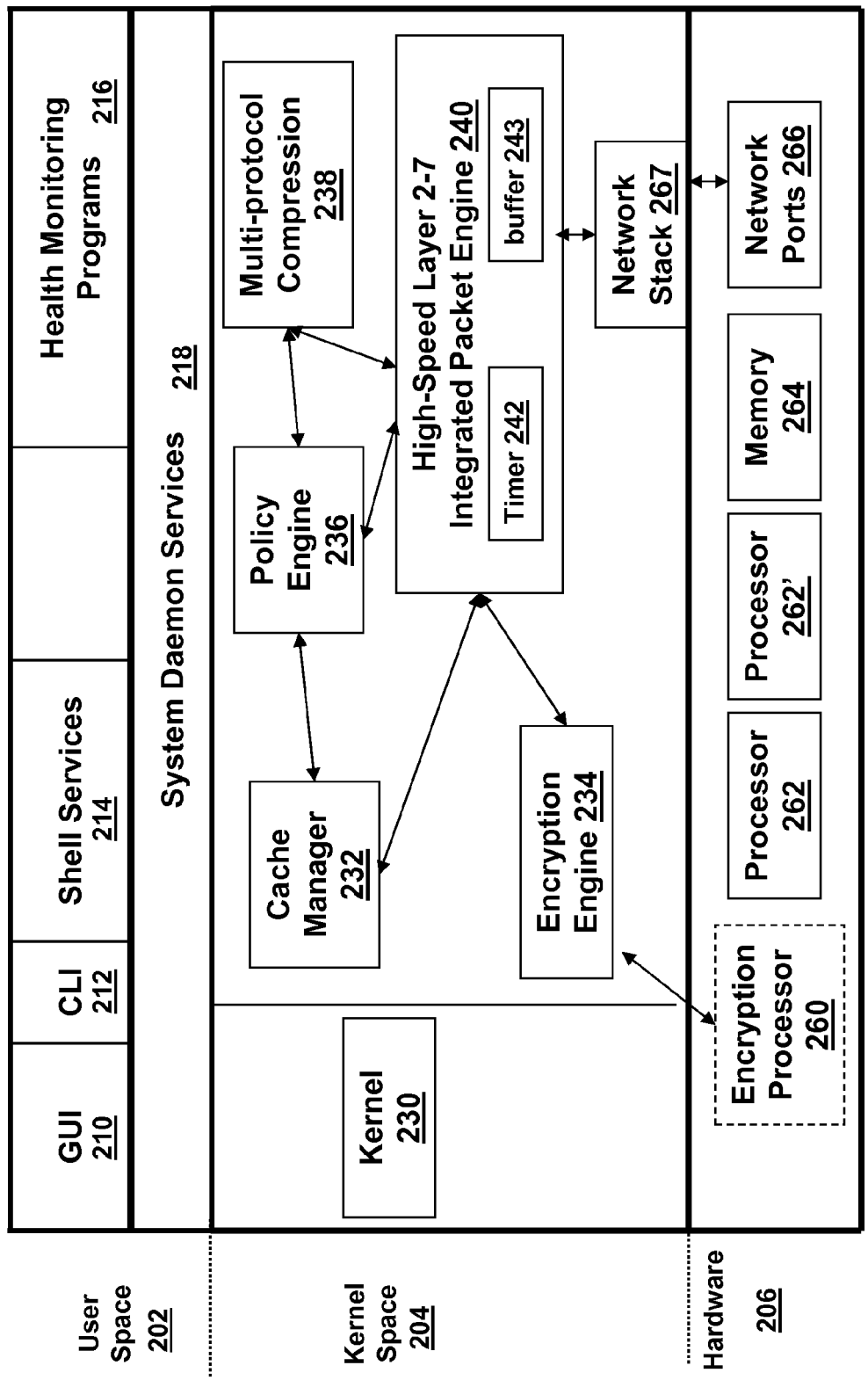
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
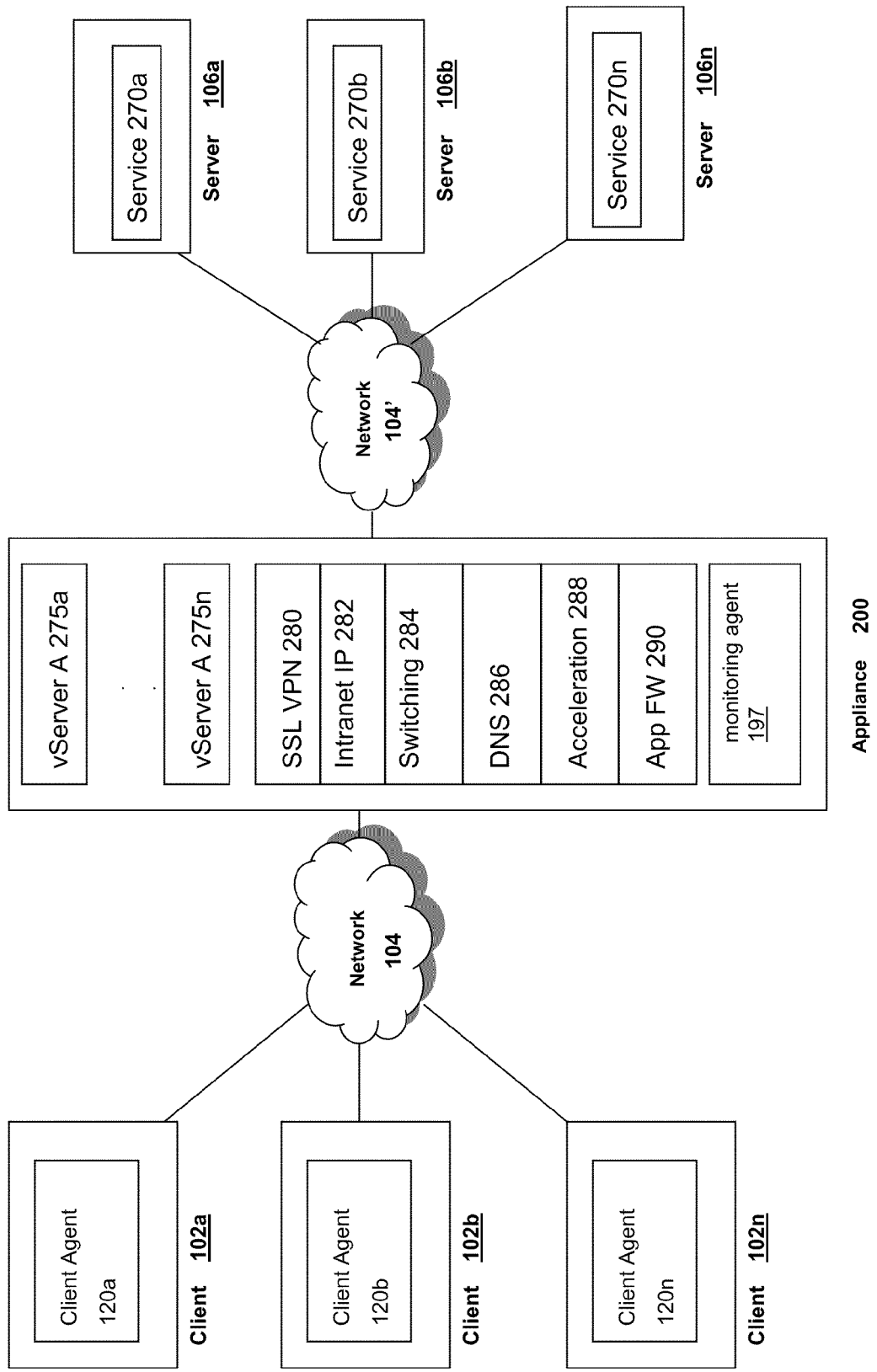
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103. In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

A virtual private network (VPN) may be any network using public telecommunication infrastructure, such as the internet, to provide remote clients, servers or other communicating devices with an access or connection into a private network, such as from a public network. A virtual private network (VPN) is a way to use a public telecommunication infrastructure, such as the Internet, to provide remote users with access to an enterprise or private network. In some embodiments, the access is secure via encryption or tunneling. In some embodiments, the intermediary described herein provides a secure virtual private network connection from a first network of the client to the second network of the server.

A Secure Socket Layer (SSL) VPN may use SSL or TLS or any other type and form of secure protocols to establish the connection with a level of security. In some embodiments, an SSL VPN may use any type and form of encryption for establishing or maintaining secure access. An SSL VPN may be established and/or accessed via a browser such as using HTTPS (Secure HyperText Transfer Protocol). An SSL VPN may be established or provided by an SSL enabled browser or application.

The SSL VPN connection or session may be established or provided by either using a client based or clientless approach A client based SSL VPN may be use any type and form of client agent or any software related agent on the client 102 to establish a SSL VPN connection or session. For example, a client based SSL VPN may be provided via an SSL VPN client agent downloaded to the client, such as downloaded from an appliance. The client agent may be designed and configured to establish and provide the SSL VPN functionality, connection and access between the client and the appliance or server.

A clientless SSL VPN may be any SSL VPN that does not use an SSL VPN client agent, software or programs downloaded and installed on the client 102 to establish the SSL VPN connection or session. In some embodiments, a clientless SSL VPN may be any SSL VPN that does not require a client 102 to install or execute a predetermined software or an executable file designed and constructed to provide SSL VPN functionality in order to establish an SSL VPN connection with another network device. In some embodiments, a clientless SSL VPN is established via an SSL enabled browser that has not downloaded or does not require the use of a VPN or SSL VPN client agent. A clientless SSL VPN connection or session may use the protocols and communications of a standard browser or application, such as an SSL enabled browser. A clientless SSL VPN connection or session may be provided by an intermediary or appliance as described herein that translates, rewrites or transforms content of requests and responses between a first network and a second network.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Clientless Virtual Private Network Environment

Figure 3A:
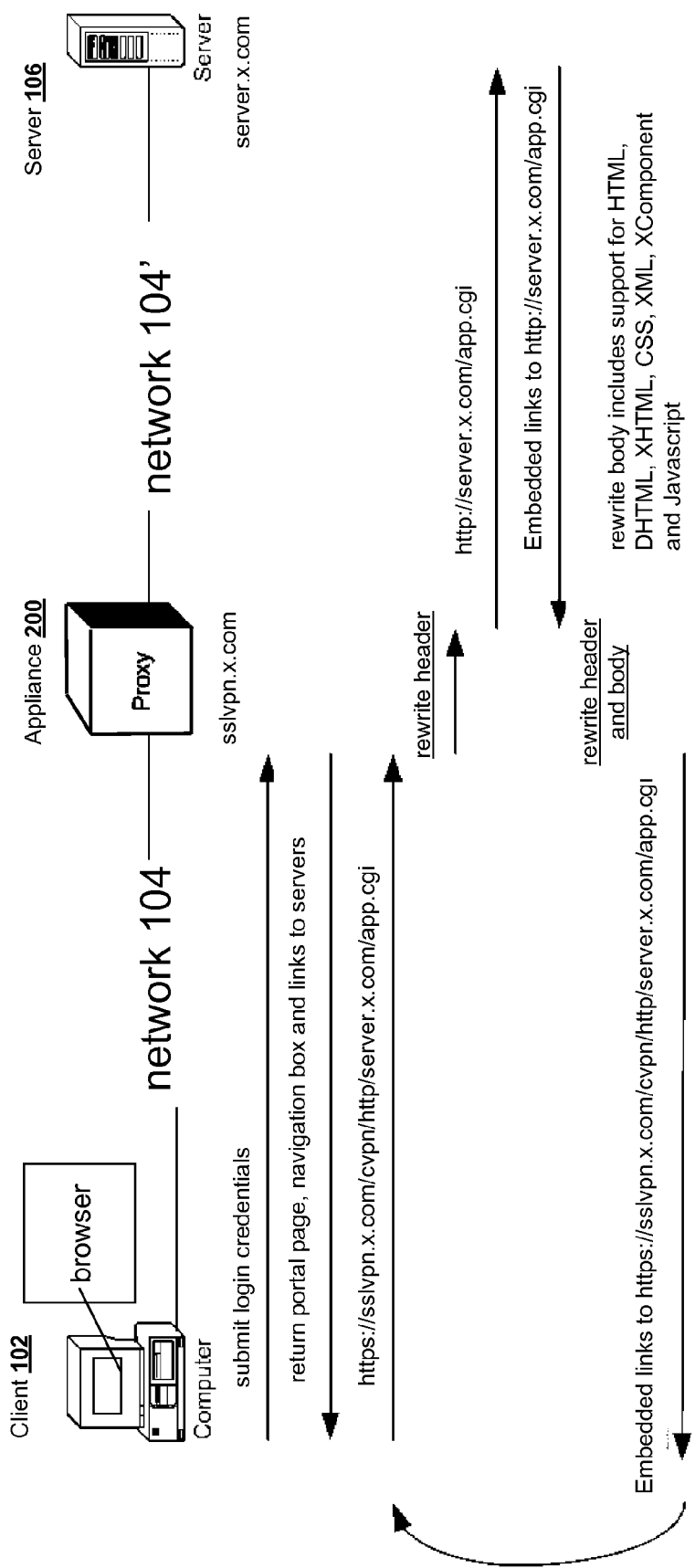
FIG. 3A is a block diagram of an embodiment of a clientless virtual private network access to a server via the appliance.

Referring now to FIG. 3A, an embodiment of a clientless virtual private network (VPN) environment for accessing a server via an appliance 200 or proxy is depicted. In brief overview, the client 102 operates on computing device 100 and executes a browser operated by a user. The client 102 may be on a first network 104, such as a public network. A user on the client 102 may request via the browser access to a resource on a second network 104', such as a private network of an enterprise. The appliance 200 provides the user a clientless VPN access to the requested resource. The client may not install, execute or otherwise any agent, component, program, driver or application that is constructed and/or designed to provide VPN connectivity (referred to as client based VPN) to the network 104'. Instead, the appliance or proxy may rewrite responses from the server and requests from the client to provide VPN functionality without the user of a VPN agent operating on the client. For example, the appliance may rewrite Uniform Resource Locators (URLs) between the client and server, such as URLs in any content server by the server or requests transmitted by the client. The appliance 200 may rewrite URLs between the client and the server in a manner transparent and seamless to either or both of the client and the server. As such, the client, browser or server and server application do not need to have knowledge or be aware of the clientless SSL VPN access scenario.

The appliance 200 may provide via an SSL VPN 280 module, previously described herein, a facility for accessing a resource. In one embodiment, the appliance 200 provides a client based access to a network by providing, installing or executing an SSL VPN agent on the client 102 for communicating with the appliance 200. In some embodiments, the appliance 200 provides for clientless SSL VPN access to a resource, such as an http/https/file share, without having to download an SSL VPN client or agent to the client 102. For example, a user may want to access the resources within company from an outside machine such at a kiosk on which he does not have privilege to install the client or does not want to go through the client installation process. The clientless SSL VPN feature is also useful when the SSL VPN client is not supported for the device (e.g. new PDA in market) but the device run an SSL enabled browser. In other embodiments, the appliance 200 chooses for a user between client-based and clientless SSL VPN access to the resource based on policy and any policy rules, actions and/or conditions.

The client may include any type and form of user agent which may be a browser, editor, spider (web-traversing robots), or any other end user tool or program. The client 102 may include any type and form of browser. In one embodiment, the browser is any version of Internet Explorer manufactured by Microsoft Corporation of Redmond, Wash. In another embodiment, the browser is any version of the Netscape browser manufactured by the Netscape Communications Corporation. In other embodiments, the browser is any version of the open source browser referred to as Firefox and provided by Mozilla Foundation of California and found at www.mozilla.com. In yet another embodiment, the browser is any version of the browser referred to as Opera manufactured by Opera Software ASA of Oslo, Norway. In some embodiments, the client 102 executes or includes any type and form of application or program for displaying web pages, web content, HTML, XML, CSS (Cascading Style Sheets), JavaScript or HTTP content.

In operation of the embodiment depicted by FIG. 3A, a user logs in at the SSL VPN site provided by the appliance 200, such at a domain name and IP address hosted by the appliance 200. For example, the user via a browser of the client 102, may select or enter a URL to the SSL VPN site. The appliance 200 may authenticate the user and may further determine authorization of the user to access the appliance 200 or the SSL VPN site. After successful authentication, the appliance serves a portal page to the client to display to the user via the browser. The portal page may include a navigation box, such as a set of one or more user interface elements for a user to select to operate or run an application. The portal page may include links to other pages or URLs to which the user may have access. The URLs or links on the portal page may reference or identify the host name or IP address of the SSL VPN site provided by the appliance 200.

The user via the portal page may select one or more URLs, for example, by clicking on an active hyperlink or URL. In response, the browser or client transmits a request to the domain hosted by the appliance 200. For example, as depicted in FIG. 3A, the user may request an application of the server 106 via the appliance: "https://sslvpn.x.com/cvpn/http/server.x.com/app.cgi". In some embodiments, the user sends another request, such as for example "https://proxy.x.com/cvpn/http/server.x.com/app.cgi". The appliance 200 receives the request from the client 102 and rewrites the request to transmit to the server. For example, as depicted in FIG. 3A, the appliance may remove or strip the domain name hosted by the appliance such as "sslvpn.x.com" or "proxy.x.com" and forward the remaining portion of the request to the server 106.

In response to the request, the server serves content to the client. The content or body of the response may include embedded links or URLs to other pages of the server or to other servers on the network 104', such as embedded links to "http://server.x.com/app.cgi". The appliance rewrites the header and body to modify any URLs to reference the domain name or IP address of the SSL VPN site so that any further URL or link selection via the browser of the client communicates requests to the appliance 200. The appliance communicates the modified content to the client 102. The appliance 200, such as via the AppFw 290, sometimes referred to as AppSecure module 290, may be designed and constructed to rewrite URLs of requests and responses based on policy of a policy engine. The links (URLs) in that page and other pages received subsequently from the server during this SSL VPN session are modified by the appliance in such a way that the links point to the SSLVPN site (VPN VIP 275) and the original request URL (absolute or relative) is encoded within that request URL.

Figure 3B:
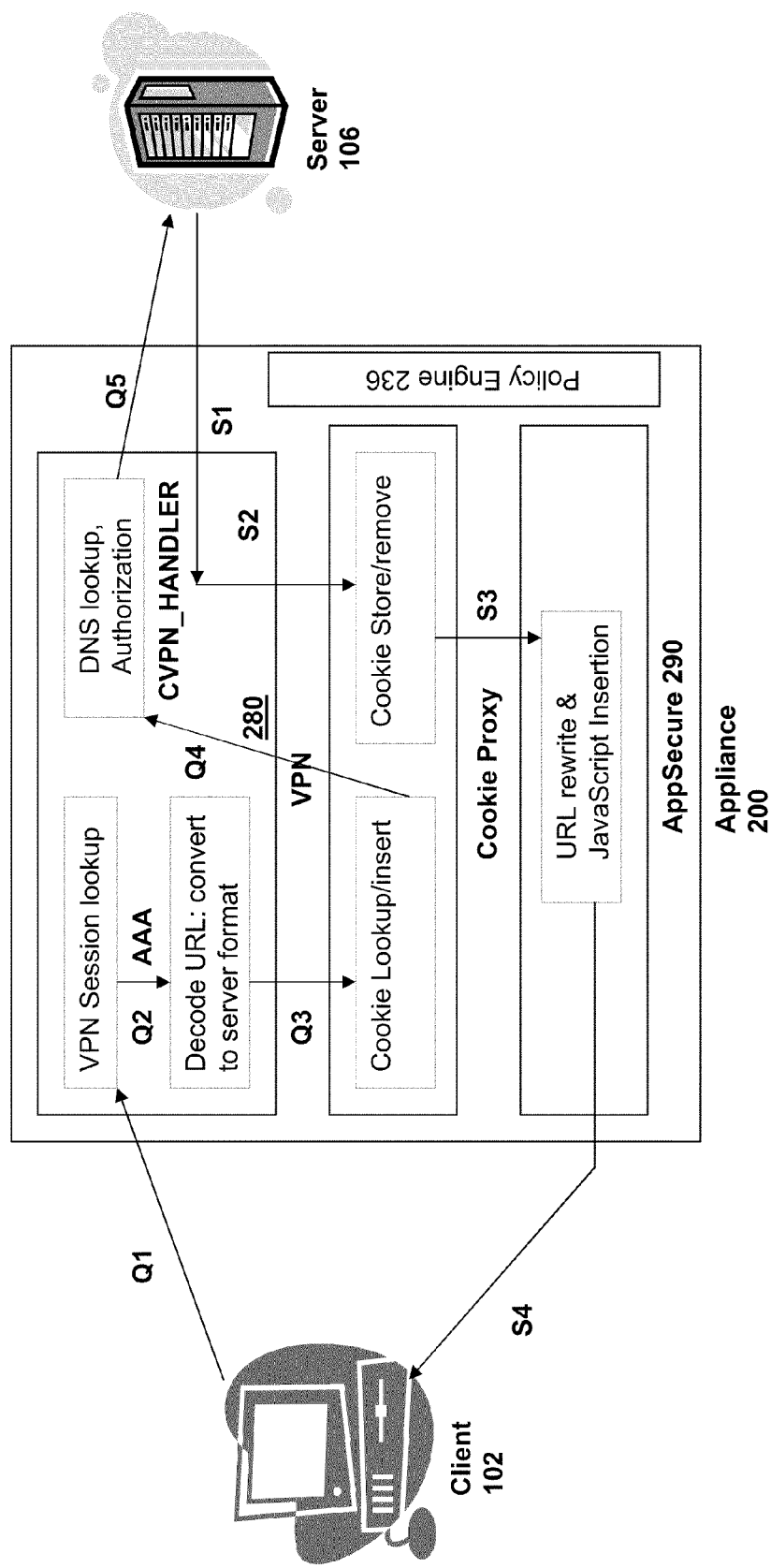
FIG. 3B is a block diagram of another embodiment of a clientless virtual private network access to a server via the appliance.

Referring now to FIG. 3B, another embodiment of a VPN environment for providing VPN access as well as cookie management is depicted. In brief overview, the appliance 200 may include a VPN module 280 for handling any of the SSL VPN functionality, clientless and/or client based, as described herein. The appliance and/or VPN module 280 may have an AAA module to perform any type and form of authentication, authorization and auditing (AAA) and/or to track and manage VPN session information. The AAA module may also perform any type and form of VPN session look to determine the VPN session for any client request. The VPN module may also perform an URL decoding and covert the URL to server format, such as to submit to a server on the private network. VPN module 280 also includes DNS lookup functionality and authorization via VPN handler function, logic or operation.

The appliance may include a cookie proxy or cookie manager for storing, tracking and managing cookies between the client and the server. The cookie may include cookie storage, referred to as a cookie jar for adding or inserting cookies as well as removing cookies. The cookie manager or proxy may include functions, logic or operations to store and look up cookie information in a cookie jar by URL, domain name or other information of the request and/or response. In some embodiments, the appliance 200 manages cookies on the behalf of clients that do not support cookies, disabled cookies or for cases where it may be desired or preferred not to send cookies to the client.

The appliance may also include an AppFW 280 also referred to as AppSecure in the context of an appliance manufactured by Citrix Systems, Inc. The AppSecure 280 module may include logic, functions or operations for perform any type and form of content rewriting, such as URL rewriting. In some embodiments, the AppSecure 280 module performs any type and form of content injection into a request and/or response between a client and a server. In one embodiment, the AppSecure module 280 injects scripts into a response to the client, such as a JavaScript, to perform any type and form of desired functionality.

Any of the components of the appliance 200 used for clientless SSL VPN access may be responsive to or driven by configuration, such as via any one or more policies of the policy engine. The policies may direct and determine the type and form of URL encoding and decoding performed by the VPN module. In some embodiments, the policies may direct and determine how and when the cookie proxy manages and proxies cookies. In other embodiments, the policies may direct and determine how and when the AppSecure module performs URL rewriting and/or content injection. The policies may direct the way a user access the private network and applications on the private networks. Policies may be configured based on access scenarios, which can include access based on any combination of a user, type and form of client, type and form of network, type of resources accessed, types of applications used, temporal information as well as any information that may be determined by the appliance via network traffic traversing thereto.

With reference to FIG. 3B, a flow of packets via the appliance 200 for clientless SSL VPN access is discussed. In response to a successful login request, the VPN appliance may send a portal page to the sender of the login request. The portal page may have one or more links in "vpn encoded form" as described in connection with FIG. 3A. The portal page flows through the response code path described below. When a user clicks on any of the URLs in the portal page, the packet flow may be implemented in a number of ways and using a number of steps. In some embodiments, for request path at step Q1, the appliance 200 may receive a URL request and look up the VPN session in the AAA module. At step Q2, the appliance may decode the VPN encoded URL to the expected URL for the server or the network 104'. The appliance may also modify the header of the request, such as the header values, to server format, or a format intended for transmission and use by the server 106, such as the HTTP server for example. The appliance may reparse the header so that any other modules of the appliance see the request in the server format. At step Q3 in the request path, the appliance via the cookie manager or proxy may look up the cookie for the request based on the domain and path of the URL. In some cases, if the request should include a cookie, the appliance may insert the cookie from a cookie jar. At step Q4, the appliance may resolve the domain name of the server present in the URL into an IP address of the server via a DNS lookup function/module of the appliance. The appliance may create server information based on the DNS lookup in the AAA module. In addition, authorization policies may be evaluated to determine if the request may be transmitted to the server. At step Q5 the appliance may send the request to the server. In some embodiments, the appliance sends the request to the server provided that the authorization is successful.

In the response path from the server to the client via the appliance, at step S1, the appliance may receive the response from the server. The VPN module 280 may process the response. The VPN module may pass the response header to the cookie proxy module and the response body to the AppSecure module. At step S2, the cookie proxy may remove cookies from the header of the response that are not configured or otherwise identified as client consumed cookies and store them in a cookie jar used for the current session. At step S3, the AppSecure module may rewrite any URL in "vpn encoded form" as per rewrite policies. The AppSecure module may also insert into the response body any scripts, such as JavaScript code to be executed at client side. At step S4, the appliance may send the modified response to the client. In many embodiments, any of the Q or S steps happen in any order or in any combination with any other steps or embodiments described herein.

D. Systems and Methods for URL ReWrite Encoding Schemes

Figure 4A:
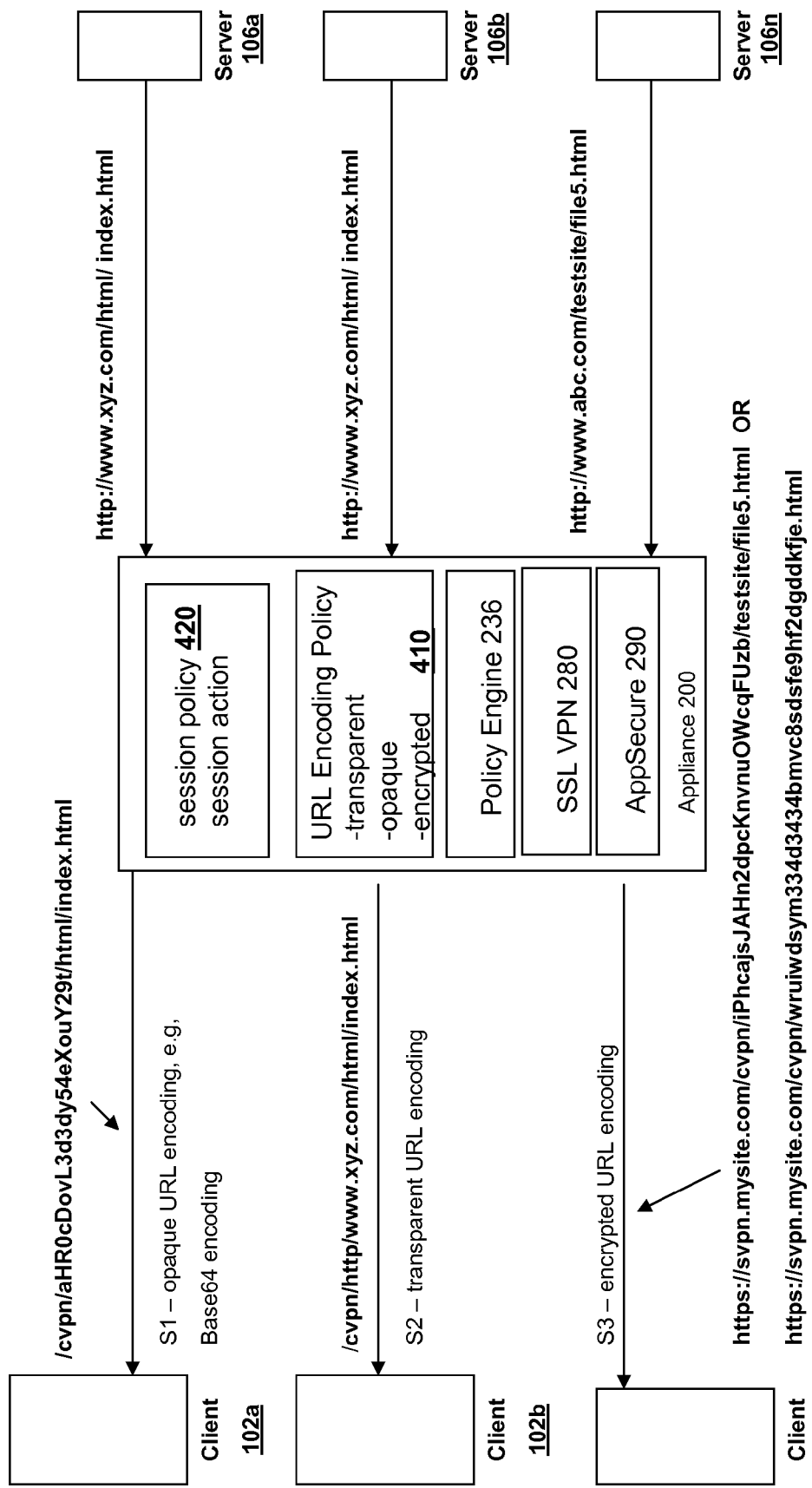
FIG. 4A is a diagram of an embodiment of a system and method for providing fine grain configuration and policy driven Uniform Resource Locator (URL) encoding schemes.

Referring now to FIG. 4A, systems and methods for providing fine grain configuration and policy driven Uniform Resource Locator (URL) encoding schemes are discussed. In brief overview, one or more clients 102A-102N may establish SSL VPN session via the appliance 200 to a server 106A-106N. Client 102A may establish a first SSL VPN session S1 via the SSL VPN site provided by the appliance 200. Client 102B may establish a second SSL VPN session S2 via the appliance 200. Client 102N may also establish a third SSL VPN session S3 via the appliance 200. The appliance 200 may be configured with one or more session polices 420 to define any rules to trigger any action to be taken with respect to any of the sessions S1-S3. In some cases, a session policy 420 directs, triggers or otherwise determines what type of URL encoding scheme or mechanism to use such as via any of the URL encoding policies 410. For example, the session policy 420 may determine the URL encoding policy 410 to use for a given session.

A URL encoding policy 410 may identify one URL encoding scheme of a plurality of available encoding schemes to use for a session. Appliance 200 may use URL encoding schemes for clientless SSL VPN access. For example, the appliance 200 may select and use one encoding scheme from a plurality of encoding schemes for clientless SSL VPN access for a particular user or a particular client 102. The appliance 200 may comprise any functionality necessary to perform selection and use of a single encoding scheme from a plurality of encoding schemes. One or more polices may direct the URL encoding scheme to use for an access scenario. For example, a policy may direct the SSL VPN module to use a predetermined type of URL encoding based on a rule or action identified for the established session of the client. As such, an administrator may configure the appliance to use one of the plurality of encoding schemes for URL rewriting during a clientless SSL VPN session based on the user's access scenario. In some other examples, a policy may direct the SSL VPN module to use a predetermined type of URL encoding based on a rule or action identified for the established user on the client, established client or an established type or group of clients.

Session policy 420 may be any type and form of policy for managing, controlling and establishing sessions. In some embodiments, session policy 420 includes rules or policies for establishing sessions between clients 102 and a servers 106, via the intermediary 200. In other embodiments, session policy 420 includes rules or policies for managing sessions or governing the type of sessions established. In some embodiments, session policy 420 includes rules for establishing limitations or privileges to the sessions of the client 102 based on information about the client. In some embodiments, session policy 420 may establish a specific session between the client 102 and server 106 based on the configuration of the client, internet protocol address of the client, history of the client or based on the user on the client 102. In further embodiments, session policy 420 includes rules for establishing limitations or privileges to any sessions established based on the type of session requested by the client 102, such as the clientless SSL VPN session or client based SSL VPN session. For example, session policy 420 may comprise a policy that establishes one type of session for one type of request and another type of session for another type of request. Similarly, session policy 420 may include policies that establish different sessions based on the type of service or resource the client 102 is requesting. In some embodiments, session policy 420 includes policies that establish different sessions based on the servers 106 that the client 102 is trying to access. The policies or rules may govern establishing as well as managing of the sessions based on any information relating the client 102, server 106, cookie configuration of the client 102 or server 106, type of network the client 102 is using, security features of the client 102 or any other information relating the client 102 or server 106. Session policy 420 may establish one session having specific characteristics for one client 102 and a different session having different characteristics for a different client 102. Specific characteristics of the sessions may include specific encoding policies available for each session, specific encoding schemes for rewriting the URLs within each session, specific communication protocols or any other similar feature of the session.

URL encoding policy 410 may be any type and form of policy used for encoding, modifying or transforming a URL. URL encoding policy 410 may be any type and form of policy for choosing one or more specific encoding schemes for modifying, encoding or transforming a URL. In some embodiments, URL encoding policy 410 includes rules and policies that choose any number of encoding schemes for encoding, transforming or modifying the URLs. In some embodiments, URL encoding policy 410 identifies an encoding scheme from a plurality of encoding schemes to be used for a particular URL, a particular client 102 or a particular server 106. In some embodiments, URL encoding policy 410 identifies one or more encoding schemes for modifying, rewriting or transforming the URLs for a particular session based on any information relating a client 102 or server 106. In some embodiments, URL encoding policy 410 identifies the an encoding scheme for transforming or rewriting URLs between a client 102 and server 106 based on the user on the client 102. In some embodiments, URL encoding policy 410 identifies an encoding scheme based on the security information of the client 102, such as the network the client 102 is using, the protection or level of security. In some embodiments, URL encoding policy 410 identifies an encoding scheme based on the session established for the client 102. URL encoding policy may include any number of different policies or schemes for transforming, modifying or rewriting the URLs using specific ways and methods. URL encoding policy may include transparent, opaque and encrypted schemes or policies, as well as any combination of such policies or schemes to be used for transforming, rewriting or modifying any number of URLs.

Each of the encoding schemes may provide different levels and granularity of security for a clientless SSL VPN access scenario. For example, in some embodiments, the URL encoding policy may identify one of the following URL encoding schemes: transparent, opaque and encrypted. A transparent URL encoding scheme may comprise a user visible reversible transformation of the URL. The transparent URL encoding scheme may transform or modify the URL to comprise a portion of the original URL within the transformed or modified URL. An opaque URL encoding scheme may use a reversible transformation which masks, hides or obfuscates any part of the URL, such as the host name and protocol. The opaque URL encoding scheme may transform or modify the URL such that it does not visibly identify or include a portion of the original URL within the transformed or modified URL. In some embodiments, opaque URL encoding schemes allow the user or the client to view a portion of the original URL within the transformed URL. The transformed URL may comprise any portion of the original URL where the original URL is masked, obfuscated or hidden. An encrypted URL encoding scheme may use a key, such as a session id. In some embodiments, the encrypted URL encoding scheme uses a randomly generated encryption key to encrypt the URL. Keys used for the encrypted URL encoding scheme may vary from user specific encryption keys to any keys generated by a symmetrical encryption system. The opaque and encrypted URL encoding schemes may obfuscate the URL to provide different levels of security.

In further details, the appliance 200 may be designed and constructed to use any type and form of URL encoding schemes and/or mechanisms. In one embodiment, the appliance 200 rewrites the URL to some unique identifier for each URL. In further embodiments, the appliance 200 rewrites the URL as path in a URL relative to the domain/IP hosted by the appliance. In one example, the appliance 200 may use the service or functionality provided by "www.tinyurl.com" to encode any URL to some relative URL under it. In further example, the functionality of "www.tinyurl.com" may be rewritten to the URL "http://www.rediff.com/index.html", or to some relative URL under the site such as "http://tinyurl.com/9oatj". In still further example, the appliance 200 rewrites the URL as any other URL which may have a different or a same host name or path. In some cases, the appliance 200 rewrites the URL provided by a server to a relative URL under the SSL VPN site provided by the appliance 200. For example, the appliance 200 may rewrite a URL, such as "http://www.y.com/index.html" into "http://sslvpn.x.com/9oatj" In some embodiments, "9oatj" is a unique identifier for a given URL. In further example, the appliance 200 rewrites a URL, such as "http://www.rediff.com/index.html" to "http://sslvpnsite.com/9oatj". The appliance 200 may map, track and store in memory or storage the rewritten URL to the original URL. When a request from the client identifying the rewritten URL is received, the appliance 200 looks up with the original URL associated or mapped to this rewritten URL. In some embodiments, a transformed URL is transformed such that it comprises a portion or a whole of original non-transformed URL within it. Sometimes, such transformation may be reversible and transparent to the user. In some embodiments, such transformation may be referred to as a transparent URL encoding scheme.

In some embodiments, the appliance may use any type and form of encryption to provide an encrypted URL encoding scheme. For example, the appliance 200 may use a session key to encrypt/decrypt URLs in response or request paths which are made relative to URLs under SSL VPN site. The session key may be stored on the appliance, in the VPN session itself, or derived using the session identifier. In some embodiments, the appliance encrypts the entire URL or a portion of the URL. In one embodiment, the appliance excludes the SSL VPN site hostname and/or extension of the file from encryption. In other embodiments, the appliance uses any key for encryption, such as a key from the SSL session provided by the appliance, or any unique information derived or determined via the network traffic. In some cases, a certificate, or any information therein, may be used for the key, such as a certificate of the client or server. In other cases, a public key and/or a private key may be used for encryption and decryption. The public or private key may be a key of the client, server or appliance or any secure or encrypted sessions between these devices. In some embodiments, the user, such as the administrator, may specify or configure the key(s) to use for encryption and/or decryption. In another embodiment, the administrator may configure the appliance to use one encryption technique from a plurality of encryption techniques.

In some embodiments, URLs which point to the SSLVPN site of the appliance and have an encoded URL in path component of URL may be referred to as "vpn encoded URLs". In some embodiments, encoded absolute URLs may be also referred to as "vpn encoded URLs". Using vpn encoded URLs has advantages in that such an approach may avoid costly lookup of the original URL in the request path. In some cases, the appliance uses an encoded URL scheme to obfuscate the URLs so that directory structure at the server is not exposed. Symmetric encryption/decryption using session key may be an approach for URL rewriting when URL encryption is needed. The appliance 200 may implement both encryption as well as decryption of the URL. In some embodiments, symmetric encryption/decryption using session key may be an approach for URL rewriting when URL obfuscation is implemented. Other types of encoding schemes or encryption schemes may be used to obfuscate the URL as desired.

By way of example, if the relative URL present in a page accessed from location "http://www.abc.com/testsite/index.html" is "contents/file5.html", the appliance, such as via the AppSecure module, converts this URL to an absolute URL "http://www.abc.com/testsite/contents/file5.html". The appliance encrypts the absolute URL "http://www.abc.com/testsite/contents/file5" using a symmetric key and arranges or places the encrypted string as part of a relative URL under the SSLVPN site, such as svpn.mysite.com. For example, if the URL without the file extension or suffix "http://www.abc.com/testsite/contents/file5" is encrypted to a string "wruiwdsym334d3434bmvc8sdsffsmds", the URL for contents/file5.html in the page provided by the appliance to the client may be "https://sslvpn.x.com/cvpn/wruiwdsym334d3434bmvc8sdsffsmds.html".

In some embodiments, the appliance may apply opaque encoding or reversible translation or encryption, which may also be referred to as vpn encoding, to any portion of an URL. In one embodiment, the appliance 200 applies vpn encoding to other portions of the URL, such as whole URL except the file extension or suffix. In another embodiment, the appliance 200 applies vpn encoding to the fully qualified domain name (FQDN) and protocol portions of the URL and the relative URLs are left unchanged. This kind of encoding may be useful when relative URLs embedded in various content types such as JavaScript are difficult to identify as relative URLs present in them can be left unchanged. In some embodiments, the appliance 200 applies opaque or reversible translation encoding to any portion of an URL. In one embodiment, the appliance 200 applies reversible translation encoding to the hostname portion of the URL. In another embodiment, the appliance applies reversible translation encoding to the protocol portion of the URL. In still further embodiments, the appliance applies reversible translation encoding to the hostname and protocol portions of the URL. In one embodiment, the appliance 200 applies reversible translation to portions of the URL other than the hostname and the protocol. In some embodiments, the relative URLs are left unchanged. The opaque or reversible translation encoding may be useful in handling relative requests at client side or supporting some scripts.

In other embodiments, such as for opaque type URL encoding, the appliance may use any type and form of reversible translation mechanism or scheme, such as Base64 encoding. In some cases, the term "Base64" refers to a MIME content transfer encoding. In other cases this term is also used as a generic term for any similar encoding scheme that encodes binary data by treating it numerically and translating it into a base 64 representation. In other embodiments, the appliance may use any type and form of binary-to-text encoding, such as base 32, uuencode or any other scheme. The reversible encoding scheme may use any type of characters, dictionary or alphabet. In one embodiment, a Base64 encoding may use a URL safe alphabet: 52 English alphabets, 10 digits and two other characters '_' and '-', and no padding may be used.

URLs encoded using reversible translations may be bookmarked for use across SSL VPN sessions and the hostname is not visible to the user without performing decoding, such as Base64 decoding. This opaque URL encoding may be used for SSL VPN clientless access where hiding the hostname strongly using an encrypted technique is not required and when hiding the directory structure is not a requirement.

By way of an example, the appliance may rewrite a URL using Base64 encoding for the index.html of a page from URL "http://www.xyz.com/html/index.html" as "/cvpn/aHR0cDovL3d3dy54eXouY29t/html/index.html". This approach allows bookmarked links to be used across SSL VPN session; and only the root-relative and absolute URLs may be rewritten. In comparison to the encrypted URL encoding technique, the opaque encoding may however may not as effectively hiding the server name or directory structure on the server.

In some embodiments, the appliance may use a transparent URL encoding scheme based on a user visible reversible translation. The appliance may rewrite URLs to make it a link to the SSLVPN site, absolute or relative, using any reversible transformations function so that original URL is more easily extracted. For example, the appliance using a transparent encoding technique may rewrite the index.html of a page from URL "http://www.xyz.com/html/index.html" as "/cvpn/http/www.xyz.com/html/index.html." This approach is very efficient in memory usage and computation as a lookup is not required. With this approach, bookmarked URLs may also be used across different SSL VPN sessions and easily bookmarked.

In yet another embodiment, the appliance may perform URL Rewriting that embeds any type and form of session information in the URL. For example, if the browser of the client does not support cookies, the appliance may embed session information in the encoded URL to identify and track the session, such as for a clientless SSLVPN access scenario. In one embodiment, the appliance stores or encodes the session id in the URL. In another embodiment, the appliance stores or encodes a unique client identifier in the URL. In some embodiments, the appliance stores or encodes cookies or cookie information in the URL. The appliance may use a reversible translation, such as a transparent or opaque approach described or an encrypted approach in rewriting the URL with the embedded session or other information. For example, a translated URLs with a session id may be rewritten in the form of "https://svpn.mysite.com/cvpns/XYZ/wruiwdsym334d3434bmvc8sdsffsmds.html" using symmetric key encryption or "https://svpn.mysite.com/cvpns/XYZ/http/www.y.com/html/index.html for a reversible translation approach, in which XYZ is the session-id for the SSLVPN. In some embodiments, the session id may be translated as part of the reversible translated portion of the URL or encrypted as part of the encrypted portion of the URL.

In some embodiments, the appliance may use any combination of the transparent, opaque and/or encryption URL encoding for the entire URL or any portion thereof. For example, the appliance may use a transparent technique for a first portion of the URL, an opaque technique for a second portion of the URL, and an encrypted technique for a third portion of the URL. The appliance may embed session information or any other appliance determined information in the first portion, the second portion or the third portion of the URL.

In yet other embodiments, the appliance may use any user defined encoding function or translation computation. In some embodiments, the user via a programming language, script, library or any other interface may identify for the appliance an encoding scheme or mechanism or encoder to use. In another embodiment, the user may specify which session, cookie or other information to store or encode in the URL, or portion thereof, and what type of encoding—transparent, opaque, encrypted or user-defined—to use, if any.

In a number of embodiments, the status of the client is determined based on the security level of the environment the client is in. For example, some clients may be in a secured network environment while other clients may be in unsecured environments. This may result in the intermediary selecting a status of the client based on the environment the client is in. In some embodiments, a status of the client is determined by collecting information about the client, such as operating system, existence and version of a personal firewall, existence and version of virus protection, type and version of browser, etc. For example, the client agent may collection information about the client.

In some embodiments, the status of the client is determined by the server 106 or the user on the server 106. In some embodiments, the status of the client is determined by the appliance 200. In a plurality of embodiments, a client is granted more access, or granted access to more applications than another client. In some embodiments, an authenticated users of a particular client has access to software, applications, or files of the server 106 which other users of other clients do not have an access to. The appliance 200 may assign a status to a client or a user of the client based on any one of, or any combination of: a level of safety or security of the network the client is in, a type of the client, a type of user of the client, operating system of the client, security system of the client, user authentication, user access, and the sensitivity of the information the requested URL provides access to. In some embodiments, the second client has a different status, credentials or access from the first user. In a plurality of embodiments, the credentials or the status of the first and second client are determined by metrics identifying the risk associated with the communication with the first client and the second client. The metrics identifying the risk associated with the communication with the first client and the second client may be any of, or any combination of: a level of safety or security of the network the client is in, a type of the client, a type of user of the client, operating system of the client, security system of the client, user authentication, user access, and the sensitivity of the information the requested URL provides access to. In many embodiments, the status and credentials are determined by a policy engine or one or more maps of the intermediary 200 or the server 106.

In some embodiments, the browsers may use the extension of the file in the request to derive the MIME type. The extension of the file, if present in the request URL may remain unchanged. In some embodiments, the extension is not present. In some embodiments, the appliance 200 checks for the presence of the extension. In some cases, the whole URL may be rewritten or encoded except for the extension. In further embodiments, the host name may be rewritten to make the host name a sub-directory under the SSL VPN site provided by the appliance 200. In other cases, only the host name and protocol are rewritten to make the host name a sub-directory under the SSL VPN site. If the host name rewritten approach is used, the relative URLs present in the page may be left unchanged and absolute URLs may need to be rewritten.

In further view of FIG. 4A, the appliance described herein provides fine granular control of the type and form of URL rewrite encoding to occur for any session traversing the appliance, such as for a clientless SSL VPN session. Either on a global level or via policy the appliance may be configured to provide a predetermined type of URL encoding from a plurality of predetermined types of encoding, such as transparent, opaque, encrypted, user-defined or any combination thereof. Via configuration or policy, the user may specify which portions or elements of a URL to apply the predetermined type of encoding. Via configuration or policy, the user may specify when and for whom to apply the URL encoding based on the access scenario.

The appliance 200 may use any portion, or combination of portions, of a network packet, request and/or response to determine conditions under which a URL encoding scheme may be used. For example, a rule of a policy may determine under what conditions to apply a predetermined URL encoding scheme based on evaluating portions of a network packet, such as any part of the header or payload of any layer or protocol of the network stack. In some embodiments, the appliance uses any portion of an HTTP header and/or any portion of HTTP body or transaction layer to determine which actions to take and/or policies to apply. In one embodiment, the appliance uses structured information, such as defined fields in a header or defined elements or structures in a body. In some embodiments, the appliance uses unstructured information, such as portions of the body identified by patterns, location, or other search and identified means. In other embodiments, the appliance used both structured and unstructured information to use in policies, and the rules and actions specified for the policy.

By way of example, a user may specify the URL encoding mechanism at a global level, such as via the following command line interface (CLI) instruction:

set vpn param-ClientLessModeUrlEncoding (opaque|transparent|encrypt)

To provide the flexibility of changing URL encoding per user, group or a vserver/VIP 275, the type of URL encoding may be configured as a parameter in a session policy's action:

add vpn session action<actionName>-ClientLessModeUrlEncoding (opaque|transparent|encrypt)

Based on actions triggered for a session based on a condition of a rule evaluating to true or otherwise being triggered, the URL Encoding mode specified with the action may be applied for rewriting URLS for the session. In some embodiments, during opaque mode only the protocol and the hostname are encoded. In further embodiments, opaque mode is default and only the protocol and FQDN are Base64 encoded so that user does not see the hostname or protocol in clear text. Any of the modes may be defined or configured to be the default URL encoding mode. In one embodiment of transparent mode, no encoding is done and user may see which host is being accessed, as well as the directory structure. In some embodiments of encrypt mode, the hostname as well as the path is encrypted with the session key. The appliance may provide any arrangement or type of GUI to provide a user interface for specifying and configuring URL encoding and related policies.

Figure 4B:
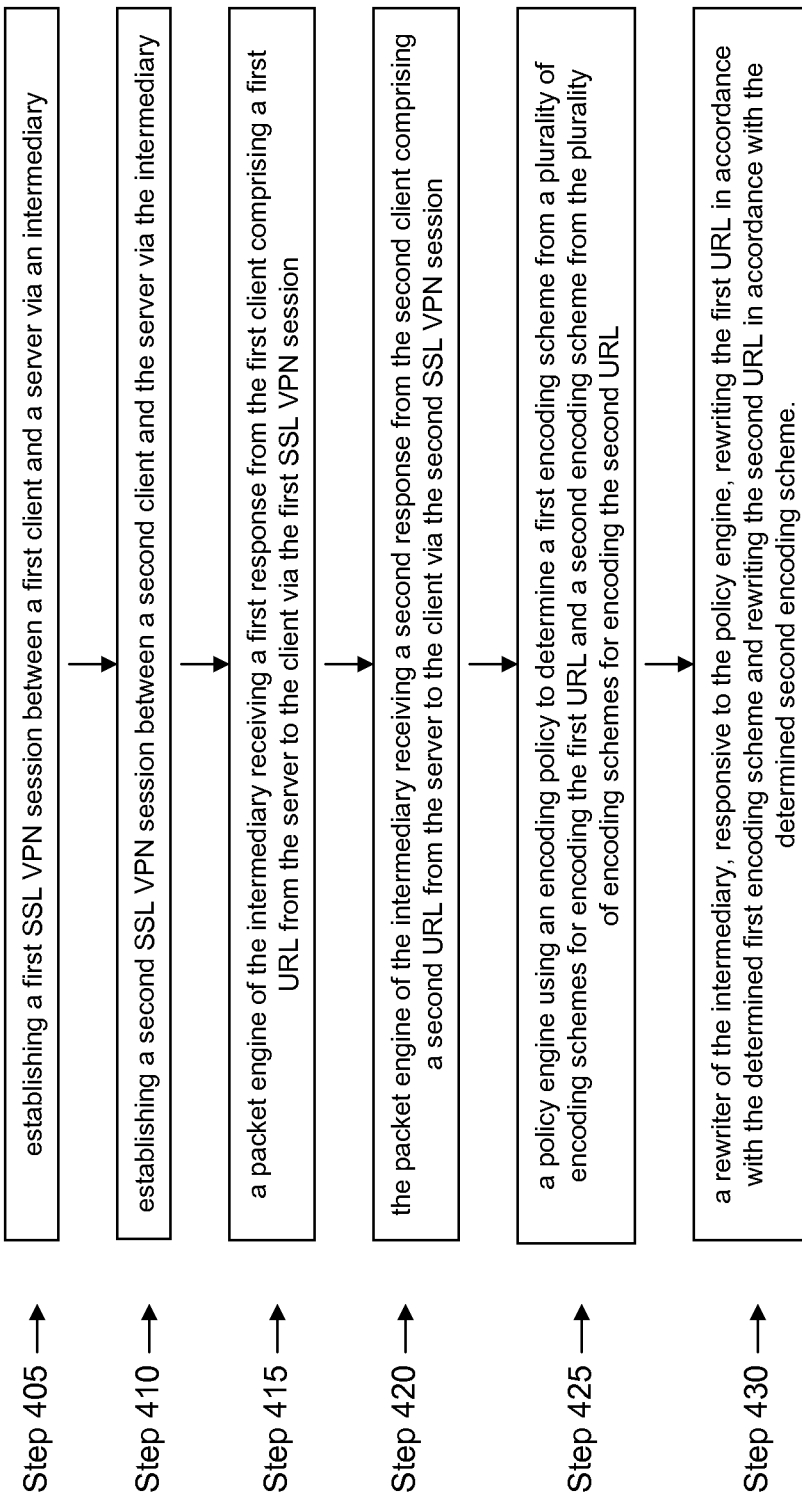
FIG. 4B is a block diagram of an embodiment of fine grain policy and configuration driven Uniform Resource Locator (URL) rewrite and encoding via an appliance.

Referring now to FIG. 4B, a flow chart of an embodiment of a method 400 for determining an encoding scheme of a URL for a SSL VPN via an intermediary 200 is illustrated. In a brief overview, at step 405, a first SSL VPN session is established between a first client and a server via an intermediary. At step 410, a second SSL VPN session is established between a second client and the server via the intermediary. At step 415, a packet engine of the intermediary receives a first response from the first client comprising a first URL from the server to the client via the first SSL VPN session. At step 420, the packet engine of the intermediary receives a second response from the second client comprising a second URL from the server to the client via the second SSL VPN session. At step 425, a policy engine uses an encoding policy to determine a first encoding scheme from a plurality of encoding schemes for encoding the first URL and a second encoding scheme from the plurality of encoding schemes for encoding the second URL. At step 430, a rewriter of the intermediary, responsive to the policy engine, rewrites the first URL in accordance with the determined first encoding scheme and the second URL in accordance with the determined second encoding scheme.

In further details, at step 405 any component of a client, a server or an intermediary establishes a first SSL VPN session between a first client and a server via an intermediary. In some embodiments, any one of the first client, intermediary or the server establishes the first SSL VPN session between the first client and the server. The first SSL VPN session may be established via any intermediary, such as the appliance 200. The SSL VPN session established may be a secured session, such as an encrypted client to server session. The first client, server or the intermediary may establish the first SSL VPN session and assign a unique first identifier for uniquely distinguishing and identifying the first SSL VPN session from other SSL VPN sessions. Any one of the first client, server and the intermediary may establish the first SSL VPN session via a communication protocol providing functionality or security to the sessions, such as a Citrix ICA protocol. In some embodiments, any one of a client, server or an intermediary establishes a SSL VPN session using a handshake between any two of the first client, server and the intermediary. In some embodiments, the establishing of the SSL VPN session includes authentication of the first client. In some embodiments, the intermediary or the server requires the first client to be authenticated using a username, a password or a combination of the username and the password, in order to establish the first session. In many embodiments, the server and the first client use encryption key to establish a secure encrypted first session.

During or upon the establishing of the first SSL VPN session, the server or the intermediary may use a policy and/or a policy engine to associate the first client with a level of access to the server or level of access to the functionalities of the server. In many embodiments, during or upon establishing of the SSL VPN session, the server or the intermediary uses one or more configured policies of a user, group or globally to associate the first client with a level of access to the server or the level of access to the functionalities of the server.

At step 410 any one of the client, server or the intermediary establishes a second SSL VPN session between a second client and the server, via the intermediary. In some embodiments, the second session is established using the same set of steps as the first session. In many embodiments, the second session is established substantially similarly to the way the first session is established. The second SSL VPN session may be assigned a unique second identifier for uniquely identifying the second SSL VPN session from other SSL VPN sessions. In many embodiments, the second SSL VPN session comprises any portion or any functionality of the first SSL VPN session. In some embodiments, the second SSL VPN session is established using an encryption key different from the encryption key used to establish the first SSL VPN session. The second SSL VPN session may be established using a same encryption key as the key used for the first SSL VPN session. In a number of embodiments, the second SSL VPN session is established using authentication from the second client, such as authentication via a username and a password. In some embodiments, the second SSL VPN session is established using a handshake between any two of the second client, intermediary or the server.

During or upon the establishing of the second SSL VPN session, the server or the intermediary may use a policy and/or a policy engine to associate the second client with a level of access to the server or level of access to the functionalities of the server. In many embodiments, the server or the intermediary uses one or more configured policies of a user, group or globally to associate the second client with a level of access to the server or the level of access to the functionalities of the server. In some embodiments, during or upon establishing of the SSL VPN session, the server or the intermediary uses a policy or a rule engine to associate the first client with a level of security of the first client or the level of threat a session with the first client may pose. In a plurality of embodiments, the server or the intermediary uses a policy, policy engine or rules to determine eligibility of the first client to establish the first SSL VPN session with the server.

At step 415, a packet engine of the intermediary receives, via the first SSL VPN session, a first response from the first client comprising a first URL from the server to the client. In some embodiments, any component of the intermediary receives the first response. The first response may be transmitted to the intermediary from the server directly, or from the server via any number of other intermediaries. The packet engine, or any other component of the intermediary, may receive any number of responses from the server comprising the first URL. In some embodiments, the first response received by the intermediary includes a plurality of URLs from the server to the client. The first response received by the intermediary via the first SSL VPN session may comprise a communication, an instruction, a data, an executable code, a source code, a file or any other type of information. In some embodiments, the intermediary receives the first response comprising a URL code previously requested by the first client via the first SSL VPN session, or a response to the URL request by the first client via the first SSL VPN session. In a number of embodiments, the intermediary receives the first response comprising an instruction or a request to access an application, a file, a data or a resource stored on the server or accessible via the server. In a number of embodiments, the intermediary receives the first response comprising a response to a request for an access to an application, a file, a data or a resource on the server. In some embodiments, the intermediary receives, via the first SSL VPN session, any number of responses comprising any number of URLs from the first client. In many embodiments, the intermediary receives any number of URLs comprising a path to a file, an application, a data, a webpage, a source code, a link or any other information provided by, or serviced by the server. In a number of embodiments, the intermediary receives a URL to a secure webpage or any other type of secured resource on the server. In some embodiments, the intermediary receives a URL to a webpage, file or an application being accessible only by selected users, selected clients or selected groups of users and clients. In some embodiments, the intermediary receives a URL path to the content of the resource, webpage, file, application or a resource made available only to clients or users which are establishing SSL VPN sessions from secured network or from a network environment recognized as secure by the intermediary or the server.

At step 420, the packet engine of the intermediary receives a second response from the second client comprising a second URL from the server to the client via the second SSL VPN session. The second response may be substantially similar to the first response and it may comprise all the features, functionalities or characteristics of the first response. In many embodiments, the second URL same as the first URL and in other embodiments, the second URL is different from the first URL. In some embodiments, any component of the intermediary receives the second response. The second response may be transmitted to the intermediary from the server directly, or from the server via any number of other intermediaries. The packet engine, or any other component of the intermediary, may receive any number of responses from the server comprising the second URL. In some embodiments, the second response received by the intermediary includes a plurality of URLs from the server to the client. The second response received by the intermediary via the second SSL VPN session may comprise a communication, an instruction, a data, an executable code, a source code, a file or any other type of information. In some embodiments, the intermediary receives the second response comprising a URL code previously requested by the second client via the second SSL VPN session, or a response to the URL request by the second client via the second SSL VPN session. In a number of embodiments, the intermediary receives the second response comprising an instruction or a request to access an application, a file, a data or a resource stored on the server or accessible via the server. In a number of embodiments, the intermediary receives the second response comprising a response to a request for an access to an application, a file, a data or a resource on the server. In some embodiments, the intermediary receives, via the second SSL VPN session, any number of responses comprising any number of URLs from the second client. In many embodiments, the intermediary receives via a second SSL VPN session, any number of URLs comprising a path to a file, an application, a data, a webpage, a source code, a link or any other information provided by, or serviced by the server. In a number of embodiments, the intermediary receives via a second SSL VPN session, a URL to a secure webpage or any other type of secured resource on the server. In some embodiments, the intermediary receives via a second SSL VPN session a URL to a webpage, file or an application being accessible only by selected users, selected clients or selected groups of users and clients. In some embodiments, the intermediary receives via a second SSL VPN session a URL path to the content of the resource, webpage, file, application or a resource made available only to clients or users which are establishing SSL VPN sessions from secured network or from a network environment recognized as secure by the intermediary or the server.

At step 425, a policy engine uses an encoding policy to determine a first encoding scheme from a plurality of encoding schemes for the first URL and a second encoding scheme from the plurality of encoding schemes for encoding the second URL. In a number of embodiments, the encoding policy determines that the first encoding scheme for encrypting a portion of the first URL is to be used for the first URL and that the second encoding scheme for not modifying the second URL is to be used for the second URL. In a number of embodiments, the encoding policy determines that the first encoding scheme for rewriting of a portion of the first URL is to be used for the first URL, and that the second encoding scheme for deleting of a portion of the second URL is to be used for the second URL. In a variety of embodiments, the encoding policy determines that the first encoding scheme for overwriting of a portion of the first URL with another made up URL is to be used for the first URL, and that the second encoding for obfuscating a portion of the second URL is to be used for the second URL. In some embodiments, the encoding policy determines that the first encoding scheme for modifying of a portion of the first URL is to be used for the first URL, and that a second encoding scheme for modifying the entire second URL is to be used for the second URL.

Sometimes at step 425, the policy engine may use information, status or credentials of a client to determine the encoding scheme for a URL. In some embodiments, the policy engine uses an encoding policy relating the security of the first or the second client to determine the first encoding scheme for the first client or the second encoding scheme for the second client. In many embodiments, the policy engine uses an encoding policy relating the level of security of the network the first client or the second client is connecting from to determine the first encoding scheme for the first client or the second encoding scheme for the second client. In various embodiments, the policy engine uses the level of access the client is granted by the intermediary or by the server for accessing or using applications, files or resources on the server in order to determine the encoding scheme of the URL of the client. In some embodiments, the policy engine uses the information relating a type of a computer or a network device the first client uses for communication with server to determine the first encoding scheme for the first URL of the first client. Similarly, the policy engine may use the information relating a type of a computer or a network device the second client uses for communication with server to determine the second encoding scheme for the second URL of the second client.

In some embodiments, at step 425 the policy engine determines the encoding scheme for the first or the second URL based on any one of, or a combination of: a status of the user authenticated on the client in terms of accessibility of the user to server's resources, a client's internet protocol address, a history of the client or the history of the user on the client, security level of the network the client is communicating from and the username and the password provided by the client during the authentication. In some embodiments, the policy engine determines the encoding scheme for the first or the second client based on the client's software application or a client's geographical location. In some embodiments, the policy engine determines the encoding scheme for the first or the second client based on statistics gathered by the server or the intermediary from previous communications with that client. In a number of embodiments, the policy engine determines the encoding scheme for the first or the second client based on the sensitivity, confidentiality or the importance of the information shared with the first or the second client. For example, the policy engine uses an encoding policy to determine that the first encoding scheme involves obfuscating and encrypting the first URL in response to recognizing the first URL as comprising sensitive or confidential information. Similarly, the policy engine uses encoding policy to determine that the second scheme involves not modifying the second URL, in response to recognizing that the second URL does not comprise any sensitive or confidential information. The policy engine may also use the encoding policy to determine that the first encoding scheme or the second encoding scheme involves any one of, or any combination of: rewriting of the first or second URLs with a fake URL, disguising or obfuscating at least a portion of the first or second URL, translating the first or the second URL into another URL and including one or more codes, code words and portions of random data into the first or the second URL.

At step 430, a rewriter of the intermediary, responsive to the policy engine, rewrites the first URL in accordance with the determined first encoding scheme and rewrites the second URL in accordance with the determined second encoding scheme. In many embodiments, any component of the intermediary rewrites any one of the first or the second URL in accordance with determined first or second encoding schemes. In some embodiments, the rewriter rewrites or modifies only the first URL or the second URL. In many embodiments, the rewriter, in response to the type of encoding scheme selected by the intermediary, rewrites, modifies, encrypts, encodes or obfuscates the first URL and the second URL. In some embodiments, the rewriter encodes or encrypts a portion of the first or the second URL according to the first encoding scheme or the second encoding scheme. In some embodiments, the rewriter uses an encrypter or decrypter for encrypting a portion of the first or the second URL using one or more encryption keys selected by the encoding scheme or the rewriter. In many embodiments, the rewriter is a device, unit, function or a component of the intermediary modifying the first URL, the second URL or the first URL and the second URL as instructed by the policy engine. In some embodiments, the rewriter modifies the first URL as instructed by the first encoding scheme from the policy engine and modifies the second URL as instructed by the second encoding scheme from the policy engine. In a number of embodiments, the rewriter receives instructions for modifying the first URL and the second URL from the policy engine or the encoding policy. The rewriter may overwrite, rewrite, delete, encrypt, decrypt, replace, obfuscate or otherwise modify in any way the first URL, the second URL or any other URL received as instructed by the policy engine or the encoding policy.

What is claimed is:

1. A method for determining an encoding scheme of a uniform resource location (URL) from a plurality of encoding schemes for a clientless secure socket layer virtual private network (SSL VPN) via a proxy, the method comprising:
   a) receiving, by an intermediary, a response from a server to a client via a first clientless SSL VPN session, the intermediary establishing the first clientless SSL VPN session between the client and the server, the received response comprising a first URL from the server;
   b) determining, by the intermediary, responsive to a policy, an encoding scheme from a plurality of encoding schemes for modifying the first URL from the server, each of the plurality of encoding schemes providing a different level of security to a clientless SSL VPN session by applying a reversible modification on a given URL to obfuscate at least a portion of the URL, the intermediary maintaining a mapping of each URL modification; and
   c) modifying, by the intermediary, the URL for transmission to the client in accordance with the determined encoding scheme.

2. The method of claim 1, wherein the policy is a session policy determining at least one rule to trigger at least one action with respect to the established session.

3. The method of claim 1, wherein the encoding scheme removes a portion of the URL.

4. The method of claim 1, wherein the encoding scheme rewrites a portion of the URL with a portion of another URL.

5. The method of claim 1, wherein the encoding scheme encrypts a portion of the URL using one or more encryption keys.

6. The method of claim 1, wherein the encoding scheme is a transparent encoding scheme.

7. The method of claim 1, wherein the encoding scheme is an opaque encoding scheme.

8. The method of claim 1, wherein the encoding scheme transforms the URL using a reversible transformation mechanism.

9. The method of claim 1, wherein the encoding scheme is an encrypted encoding scheme encrypting a portion of the URL.

10. The method of claim 1, wherein the encoding scheme rewrites the URL to a unique identifier, the unique identifier uniquely identifying the URL.

11. The method of claim 1, wherein the encoding scheme obfuscates an information relating a directory structure of the server from the URL.

12. The method of claim 1, further comprising the steps of:
   d) receiving, by the intermediary, a second response from the server to a second client via a second SSL VPN session, the intermediary establishing the second SSL VPN session between the second client and the server, the second response comprising a second URL;
   e) determining, by the intermediary, responsive to the encoding policy, a second encoding scheme from a plurality of encoding schemes for encoding the URL; and
   f) rewriting, by the intermediary, the second URL for transmission to the second client in accordance with the determined second encoding scheme.

13. The method of claim 12, wherein the policy is a second SSL VPN session policy determining at least one rule to trigger at least one action with respect to the established SSL VPN session.

14. An intermediary for determining an encoding scheme of a uniform resource location (URL) from a plurality of encoding schemes for a clientless secure socket layer virtual private network (SSL VPN) via a proxy, the intermediary comprising:

a packet engine for receiving a response from a server to a client via a first clientless SSL VPN session, the intermediary establishing the first clientless SSL VPN session between the client and the server, the received response comprising a first URL from the server;

a policy engine determining, responsive to a policy, an encoding scheme from a plurality of encoding schemes for modifying the first URL from the server, each of the plurality of encoding schemes providing a different level of security to a clientless SSL VPN session by applying a reversible modification on a given URL to obfuscate at least a portion of the URL, the intermediary maintaining a mapping of each URL modification; and a rewriter, responsive to the policy engine, modifying the URL for transmission to the client in accordance with the determined encoding scheme.

15. The intermediary of claim 14, wherein the policy is a session policy determining at least one rule to trigger at least one action with respect to the established SSL VPN session.

16. The intermediary of claim 14, wherein the encoding scheme removes a portion of the URL.

17. The intermediary of claim 14, wherein the encoding scheme rewrites a portion of the URL with a portion of another URL.

18. The intermediary of claim 14, wherein the encoding scheme encrypts a portion of the URL using one or more encryption keys.

19. The intermediary of claim 14, wherein the encoding scheme is a transparent encoding scheme.

20. The intermediary of claim 14, wherein the encoding scheme is an opaque encoding scheme.

21. The intermediary of claim 14, wherein the encoding scheme transforms the URL using a reversible transformation mechanism.

22. The intermediary of claim 14, wherein the encoding scheme is an encrypted encoding scheme encrypting a portion of the URL.

23. The intermediary of claim 14, wherein the encoding scheme rewrites the URL to a unique identifier, the unique identifier uniquely identifying the URL.

24. The intermediary of claim 14, wherein the encoding scheme obfuscates an information relating a directory structure of the server from the URL.

25. The intermediary of claim 14, further comprising the steps of:

the packet engine for receiving a second response from a server to a second client via a second SSL VPN session, the intermediary establishing the second SSL VPN session between the second client and the server, the second response comprising a second URL;

the policy engine determining, responsive to an encoding policy, a second encoding scheme from the plurality of encoding schemes for encoding the second URL; and the rewriter, responsive to the policy engine, rewriting the second URL for transmission to the client in accordance with the determined second encoding scheme.

26. The intermediary of claim 25, wherein the policy is a second SSL VPN session policy determining at least one rule to trigger at least one action with respect to the established second SSL VPN session.

* * * * *